(12) United States Patent
Civilini (10) Patent No.: US 9,529,641 B2
(45) Date of Patent: Dec. 27, 2016

(54) DATA CENTER THERMAL MODEL

(71) Applicant: Cisco Technology, Inc., San Jose, CA (US)

(72) Inventor: Massimo Civilini, Redwood City, CA (US)

(73) Assignee: Cisco Technology, Inc., San Jose, CA (US)

(*) Notice: Subject to any disclaimer, the term of this patent is extended or adjusted under 35 U.S.C. 154(b) by 622 days.

(21) Appl. No.: 13/975,522

(22) Filed: Aug. 26, 2013

(65) Prior Publication Data

US 2015/0057828 A1  Feb. 26, 2015

(51) Int. Cl.
| | |
|---|---|
| *G06F 9/50* | (2006.01) |
| *G05B 13/04* | (2006.01) |
| *H05K 7/14* | (2006.01) |
| *G05D 23/19* | (2006.01) |
| *G01K 7/42* | (2006.01) |
| *H01L 23/34* | (2006.01) |

(Continued)

(52) U.S. Cl.
CPC ............ *G06F 9/5094* (2013.01); *G01K 7/427* (2013.01); *G05B 13/048* (2013.01); *G05D 23/193* (2013.01); *G05D 23/1917* (2013.01); *G06F 1/206* (2013.01); *G06F 17/5009* (2013.01); *H01L 23/34* (2013.01); *H05K 7/1497* (2013.01); *H05K 7/20836* (2013.01); *G06F 2217/80* (2013.01); *Y02B 60/142* (2013.01)

(58) Field of Classification Search
CPC .......... G06F 1/20; G06F 1/206; G06F 1/3203; G06F 1/3206; G06F 9/455; G06F 9/4893; G06F 9/5094; G06F 11/3062; G06F 17/5009; G06F 2217/16; G06F 2217/80; H05K 7/20745; H05K 7/2079; H05K 7/20836; H05K 7/1497; Y02B 60/1275; H01L 23/34; G05B 13/048; G05B 17/02; G06Q 10/04; G06Q 50/06; G01K 7/425; G05D 23/1931
See application file for complete search history.

(56) References Cited

U.S. PATENT DOCUMENTS 7,644,051 B1 * 1/2010 Moore ................. G05B 13/027
706/16
7,726,144 B2 * 6/2010 Larson ............... G05D 23/1931
165/104.33

(Continued)

OTHER PUBLICATIONS

Patel et al., "Thermal Considerations in Cooling Large Scale High Compute Density Data Centers", Eighth Intersociety Conference on Thermal and Thermomechanical Phenomena in Electronic Systems, Jan. 2002, pp. 767-776.

(Continued)

*Primary Examiner* — Crystal J Barnes-Bullock (57) ABSTRACT

A system for managing a data center including a plurality of electronic components, each of which are configured to generate varying levels of heat loads under varying power level utilizations, is disclosed. The system may comprise a data collection module adapted to collect data describing heat loads generated by the plurality of electronic components; an implementation module adapted to implement a model to predict a thermal topology of the data center, wherein the model is based on thermodynamic state equations; and a control module adapted to adjust the heat load of at least one of the plurality of electronic components based on the model.

19 Claims, 4 Drawing Sheets

(51) Int. Cl.
*G06F 1/20* (2006.01)
*G06F 17/50* (2006.01)
*H05K 7/20* (2006.01)

(56) References Cited

U.S. PATENT DOCUMENTS

| | | | | |
|---|---|---|---|---|
| 8,489,745 B2 * | 7/2013 | Mandagere | ............ | G06F 1/3203 |
| | | | | 709/223 |
| 8,631,411 B1 * | 1/2014 | Ghose | ............ | G06F 1/206 |
| | | | | 361/676 |
| 8,688,413 B2 * | 4/2014 | Healey | ............ | H05K 7/20745 |
| | | | | 703/2 |
| 8,694,279 B1 * | 4/2014 | Stiver | ............ | H05K 7/20836 |
| | | | | 165/104.33 |
| 8,762,522 B2 * | 6/2014 | Moon | ............ | G06F 9/5094 |
| | | | | 709/224 |
| 8,849,630 B2 * | 9/2014 | Amemiya | ............ | G06F 1/206 |
| | | | | 703/14 |
| 8,949,091 B2 * | 2/2015 | Bhagwat | ............ | H05K 7/20836 |
| | | | | 703/13 |
| 8,965,748 B2 * | 2/2015 | Iyengar | ............ | G06Q 10/04 |
| | | | | 703/21 |
| 9,295,183 B2 * | 3/2016 | Bhagwat | ............ | H05K 7/20836 |
| 9,342,079 B2 * | 5/2016 | David | ............ | G05D 23/00 |
| 9,392,733 B2 * | 7/2016 | Day | ............ | H05K 7/20754 |
| 2006/0161307 A1 | 7/2006 | Patel et al. | | |
| 2007/0089446 A1 | 4/2007 | Larson et al. | | |
| 2011/0213508 A1 | 9/2011 | Mandagere et al. | | |
| 2013/0317785 A1 * | 11/2013 | Chainer | ............ | H05K 7/2079 |
| | | | | 703/1 |
| 2014/0029196 A1 * | 1/2014 | Smith | ............ | G05D 23/1934 |
| | | | | 361/679.53 |
| 2015/0025833 A1 * | 1/2015 | VanGilder | ............ | H05K 7/20836 |
| | | | | 702/136 |
| 2015/0261898 A1 * | 9/2015 | Gupta | ............ | F01K 13/003 |
| | | | | 703/18 |

OTHER PUBLICATIONS

International Search Report and Written Opinion in counterpart International Application No. PCT/US2014/051046, mailed Feb. 9, 2015, 12 pages.

\* cited by examiner

DATA CENTER THERMAL MODEL

TECHNICAL FIELD

The present disclosure relates generally to power systems and in particular to a data center thermal model for real-time power consumption optimization.

BACKGROUND

In a data center, the total power consumption includes the sum of computational and non-computational energy. However, computational energy used by servers and other network appliances generates the majority of the heat in the data center environment. The relative temperature increment should be controlled to avoid computer malfunction. Typically, an air conditioning system is used to control the ambient temperature. However, the air conditioning system consumes power; in some cases, up to about half of the total power consumed in a data center. The computing, storage, and other network appliances consume another third of the total power consumed. The discrepancy is due to inefficiencies of the cooling system, in particular related to the generation and distribution of cool air. The distribution of cool air is largely dependent on the geometry of the data center. The general problem of data center cooling is a function of heat generation and air movement to dissipate the heat generated. Conventional systems implement complex models that use huge computational power in order to optimize heat distribution loads. What is needed is a simple model that can be used to mitigate the cooling system efficiency problem.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

In a data center (DC) the energy consumption is driven by the energy used by servers and network appliances. This energy is almost entirely released in the ambient as heat and the relative temperature increment is controlled by an air conditioning cooling system that also uses energy. There are other contributors to energy consumption, such as lights, but these are at a level of one order of magnitude lower.

Computational and cooling power are connected and they depend on how heat and cool air are dispersed in the ambient. The dynamics of the heat is also dependent on the geometry of the DC. The heat dynamics mix local dependencies on how heat is released with the more general problem of air circulation.

In most conventional DCs the heat sources (e.g., network appliances and servers) are almost uniformly distributed on the floor plan and the air conditioning volume and temperature are determined based on ambient temperature measurements at a few points inside the DC. This can be considered the level zero of the DC power management, where the global heat released must be balanced by an equivalent amount of air conditioning. This kind of control may be sufficient to provide an acceptable operative level for the machines inside the DC, but it is not optimized and it is not in line with the goal of saving energy. In other words, because this approach is global with respect to the DC, special geometrical conditions are not evaluated and may result in stagnation points creating "temperature hot spots" that can give false indications for the air conditioning control, resulting in wasted energy.

Another problem that may trigger energy wastes in a DC is when a heat source (e.g., server) is moved. This movement may be of two types. The first one is physical, when a physical machine is moved from one rack to another. The second is when the physical machine remains in the same place, but the computational load is moved; for example, this is the case when a virtual machine (VM) is moved in a virtualized system or appliance. This activity changes the dynamics of the heat and the conditions where the temperature sensors operate, which usually are not moved with consequences on the air conditioning operations.

In conventional systems, one approach to tracking the airflow temperatures is to calculate the airflow temperatures through use of computational fluid dynamics (CFD) programs. This approach, however, often requires the CFD programs to run for many hours due to the complexities involved in calculating the airflow temperatures and is thus unsuitable for many applications. Other than requiring a long time for the simulations, they are also very difficult to define in terms of boundary conditions. For example, they require a detailed knowledge of the airflow from each system, which may be determined by the internal temperature of the system itself, and then are regulated by other parameters like the intake temperature or the computing load. As DCs increase in size and density, greater computational effort is involved to use the CFD programs.

CFD models are generally precise, but they are difficult to use in terms of boundary conditions and do not give answers that can be used to forecast and drive the computing load distribution. A data center is a dynamic environment, where racks and systems may be moved, added, or altered in terms of loads and where the boundary conditions on which a CFD model was defined may no longer valid. If the design of a DC initially uses a certain configuration, changes such as these may lead to cooling inefficiencies, heat stagnation, and high differential temperatures inside the DC. What is needed is a model that is easy, elastic, and fast enough to adapt rapidly to these changes and give answers in near real-time to allow complete control of the environment.

To solve these problems, an approach that analyzes local behaviors in the more general problem of heat distribution is described. In embodiments described herein, a model is used to depict how the heat is moving and, as a consequence, creates a thermal model for a data center. The thermal model may be refreshed and maintained much faster than conventional models because the models avoid using CFD equations. In an embodiment, a real-time data center thermal data model is provided.

The General Model

Solving CFD equations is further complicated by the difficulty in removing terms from the basic set of equations and by the need to keep the dimensions of the cell small to avoid instabilities. Usually the number of cells necessary to describe the entire environment and the numerical methods necessary to adapt and integrate the equations in the model require the power of a super-computer to obtain usable solutions.

In contrast, the approach described here reduces the complexity of the equations by enlarging the dimension of the cells to a size where the local effects may be considered internal mixing motions. As a result, the parameters can be replaced with their average values. One advantage of this approach is that the average values are no longer regulated by the CFD equations but can be calculated using thermodynamics state equations. The physics of the overall system is the same and the effects to evaluate are the same (convection, conduction, etc.) but their contribution is averaged in space and local terms like vortexes generated by rotational terms do not contribute to the final parameter values. Using average values means that the approach described cannot evaluate local conditions; the cell is a black box and local values do not have any meaning.

The model uses average parameters, allowing the cell dimension to increase to large volumes. The cell volume should be configured large enough to guarantee that the local conditions do not affect the exchange with the other cells. This configuration reduces the complexity of the model by reducing the total number of cells. By using large cells, another advantage is equation reduction. Where partial differential equations are used in CFD equations, the model disclosed herein uses algebraic expressions. Because the approach uses average values on large volumes, the system is regulated by state equations and consequential thermo dynamical relationships.

Configuring the cell size is very flexible and largely dependent on the data center environment. One aspect to consider is local conditions around a server or a rack. For example, one important local condition is the air intake/exhaust of a server. The air ejected from servers creates vortexes and non-linear heat exchange in a range that has been estimated around one meter. This is the order of magnitude of the cell. Further, it is convenient to define cells ranging from the floor to the ceiling. In some examples, the cell has a square base. Thus, as an example, a cell may be configured as a two meter by two meter footprint with a height equal to the distance from the floor to the ceiling in the data center.

Within a cell, the model uses the average value of various parameters. Thus, values acquired from the sensors typically report the instantaneous local status of a parameter. This instantaneous value does not have a clear connection with an average value unless a spatial or temporal averaging is performed.

Model Equations

This section outlines the forces and effects that drive air movements between two cells. In this environment the main variables are pressure, temperature, and the amount of air (e.g., number of moles) present. The velocity of the air is also important to determine the mass exchange between two cells.

Another important difference when compared to CFD equations is that the base time increment utilized by the numerical model is significantly larger in this case due to the need to mediate the condition on the size of the cell. As a result, this allows longer simulations with a reduced number of parameters. In various embodiments, a time interval between one and ten seconds may be used without significantly affecting the final result.

With these assumptions the magnitude of the macro-effects connected with the cells is calculated as follows:

Assume that a cell of has the dimensions of 2×2×3 meters, resulting in a fixed volume of V=12 m³. Further assume an initial pressure and temperature of:

P=1 atm=101325 Pa T=68° F.=20° C.=293° K

Assuming the molecular weight for the air of 29 gr/mole the number of moles in V is:

$$N = \frac{P \cdot V}{R \cdot T} = 499 \text{ moles}$$

with R as the gas constant (8.314 m³*Pa/(mol*K)), where m is meters, Pa is pressure measured in pascal, mol is the number of moles, and K is the temperature in Kelvin.

A typical server utilizes air to remove the heat radiated as a result of the computational power. In the example, we assume that the server is on the edge between two cells; it takes the air from one cell ("intake cell"), heats it up inside the box and expels it in the adjacent cell ("exhaust cell"). One or more fans are used to move the air.

Further, for this example, assume an initial average temperature of the intake and exhaust cells of 20° C., an average computational power dissipated in air of 150 Watts, and a fan air flux of 6 liter/sec (where fan air flux may refer to one or more fans moving air).

There are two fundamental attributes of a cell that are analyzed: temperature and pressure. The temperature of a cell may be analyzed by first considering the server exhaust air temperature.

When a server is initially powered on, the hardware inside of the case is relatively cold. As a result, some of the computational power is expended to heat up the server case and its contents. The hardware will continue to heat up to a temperature that allows the air to remove all of the dissipated heat. While the air temperature of the exhaust depends only by the air flux and the adsorbed computational power, the temperature of the case and the hardware depend on several other factors like the efficiency of heat exchange and materials. This is a transient effect that disappears after few minutes. There are methods to take care of this term that is mostly dependent of the specific server or appliance but it does not affect the results of the model, especially for long simulations. For the simplified model in this document we have:

WA(t) computational power
WD(t) power dissipated in air as heat
with the assumption that WD(t)=WA(t) for every value of t.

At equilibrium, if WD(t) is the power dissipated (in δt seconds) the associated heat is:

$$\Delta Q_t = WD_t \cdot \delta t = ma_t \cdot Cs \cdot (T_{ex} - T_{in})$$

where:
$ma_t$ mass of the air used to extract the heat
Cs specific heat of the air
$T_{in}$ intake air temperature
$T_{ex}$ exhaust air temperature
The volume of the air used to extract the heat is:

$$V_t = af_t \cdot \delta t \text{ with } af_t \text{ being the fan air flux}$$

And the mass associated with it is:

$$ma_t = \frac{V_t}{MolVol} \cdot MW \text{ where } MolVol = \frac{R \cdot T}{p}$$

and MW is the molecular weight

A good approximation for T is the exhaust temperature and for P is the average pressure in the exhaust's cell. The heat from power dissipation should be removed completely to guarantee equilibrium:

$$WD_t \cdot \delta t = \frac{af_t \cdot \delta t \cdot P_t \cdot MW}{R \cdot T_{ex}} \cdot Cs \cdot (T_{ex} - T_{in})$$

The exhaust temperature is then:

$$T_{ex} = T_{in} \cdot \left(\frac{A}{WD - A}\right) \text{ where } A = \frac{af_t \cdot P_t \cdot MW \cdot Cs}{R}$$

"A" has the dimension of a power and its temporal value is regulated by the "$af_t$" and "$P_t$" dependency on time.

When air is injected into a cell with a defined volume, it provokes changes in the parameters describing the state of the cell; in particular, the pressure P and the temperature T. If the injected air has a different temperature than the current temperature in the cell, the cell temperature will change to accommodate the unbalanced heat or cold. The increase in temperature due to the pressure increase is negligible for the values of P discussed here. As such, the following discussion focuses on the increase in temperature due to the temperature of the influx air.

The server removes a volume $V_t$ of air from the intake cell and adds the same volume of heated air to the exhaust cell ($V_t$ should not be confused with the volume of a cell, which is constant over time). Removing the air from the intake cell does not appreciably alter the cell temperature. The unbalanced heat carried by the injected air is given by:

$$\Delta Q = ma_t \cdot Cs \cdot (T_{ex} - Tc) = \Delta n \cdot MW \cdot Cs \cdot (T_{ex} - Tc)$$

where:
Tc cell temperature
Δn injected air mole number $$\left[= \frac{V_t}{MolVol} = \frac{P \cdot V_t}{R \cdot T_{ex}}\right]$$

The numerical value for this heat can be positive or negative. This unbalanced heat changes the cell temperature. Assuming that the heat is uniformly distributed in the cell the following relation holds:

$$\Delta Q = \Delta n \cdot MW \cdot Cs \cdot (T_{ex} - Tc) = (N + \Delta n) \cdot MW \cdot Cs \cdot (Tc_{fin} - Tc)$$

and $$Tc_{fin} = Tc + \frac{\Delta n}{N + \Delta n} \cdot (T_{ex} - Tc)$$

The resulting temperatures depend on the time interval considered (air injection time). As an example TABLE 1 illustrates the resulting values for some time intervals.

TABLE 1

| δt [sec] | Tex [° C.] | Δn [mole] | ΔQ [J] | $Tc_{fin}$-Tc [° C.] |
|---|---|---|---|---|
| 1 | 42.2 | 0.232 | 150 | 0.010 |
| 2 | 42.2 | 0.464 | 300 | 0.021 |
| 5 | 42.2 | 1.159 | 750 | 0.051 |
| 10 | 42.2 | 2.319 | 1500 | 0.103 |
| 20 | 42.2 | 4.637 | 3000 | 0.205 |

In this table δt represents the air injection time and the cell volume is constant.

Now we turn to a discussion of the pressure within the exhaust cell. There are two factors affecting the pressure value after the injection: (1) a certain amount of matter is added to a fixed volume and (2) the injected air has a different temperature than the cell base temperature. This can be mathematically expressed as:

$$\Delta P = \left(\frac{R}{V}\right) \cdot (T \cdot \Delta n + n \cdot \Delta T) = \Delta P_m + \Delta P_T$$

where the term containing TΔn represents the induced pressure differential due to the mass contribution and the term containing nΔT represents the induced pressure differential due to the temperature contribution.

Assuming, for example, δt=2 sec, the values for the two terms are:
$\Delta P_m$=94.189 Pa corresponding to an increase of 0.093% of the base pressure
$\Delta P_T$=7.13 Pa corresponding to an increase of 0.007% of the base pressure The basic relation is PV=nRT or P=(R/V)nT. This is the initial value of the pressure or P(i). There can be two different contributions:
a. A certain amount of air is added or n->n+Δn and the final value of the pressure is P(f)=(R/V)(n+Δn)T or P(f)=P(i)+(R/V) ΔnT that as differential is $\Delta P_m$=P(f)−P(i)=(R/V) ΔnT
b. The increase in temperature T->T+ΔT makes the pressure to increase with the following relation P(f)=(R/V) n(T+ΔT) or P(f)=P(i)+(R/V)nΔT that in differential form gives $\Delta P_T$=(R/V)nΔT To determine the numerical values: Δn and ΔT are derived from TABLE 1 from above when δt=2 sec and R, V, T and N are derived from above, where R is the gas constant, V is the volume of the cell (in this example 12 m³), T=68° F.=20° C.=293° K, and N is the number of moles=499 moles.

When the air is removed from the cell, $\Delta P_T$ is null because there is no heat added to cell volume and the total pressure drops following the mass component $\Delta P_m$ only.

When the air is injected the pressure increases and propagates through the cell up to the exchange surfaces with adjacent cells. To understand the dynamics connected to this propagation we need to understand more about the forces acting inside the cell, at least an order of magnitude. This analysis will be useful to understand the reaction time of the system in terms of mass exchange and how it related to the model's constants.

The acceleration of the unit of mass of air under the stress of a pressure gradient can be expressed as:

$$accel = \left| \frac{1}{\pi} \cdot \frac{\Delta P}{L} \right|$$

where:

$\Delta P$ pressure gradient

L distance between the points where the pressure gradient is measured $\rho$ air density ($\sim 1.29$ Kg/m$^3$)

This acceleration makes the air move toward the point with lower pressure and this movement is characterized by the displacement x(t). The movement creates a mass transfer that changes the cell's pressure in an effort to equilibrate the system. To write an equation to describe the dynamics we need to express $\Delta P$ in terms of the parameter x(t).

The pressure gradient is dependent on the amount of mass in the cells:

$$\Delta P(x) = P_{cell\_A}(x) - P_{cell\_B}(x) = \frac{R \cdot Tc}{V} \cdot (n_{cell\_A}(x) - n_{cell\_B}(x)) = \frac{R \cdot Tc}{V} \cdot \Delta n(x)$$

Under the effect of acceleration the air moves and mass is transferred from the cell with more air mass to the cell with less air mass through the exchange surface between the two cells. The air moves from one cell to another adjacent cell. These two cells will share a surface of contact. The air moving between these two cells will use this surface in its entirety or just for a portion if there is something obstructing the air movement. ExcSup is the surface between two adjacent cells used when air transfers from one cell to another. Assuming ExcSup, an exchange surface with a displacement of 'x' will transfer a volume $V_{trsf}$ and mass between cells of:

$$\Delta n(x) = \frac{V_{trsf}}{MolVol} = \frac{ExcSup}{R \cdot Tc} \cdot P_{aver}$$

where:

MolVol molar volume $P_{aver}$ average pressure

Considering that the acceleration must have opposite sign with respect to the pressure gradient the equation governing the dynamics is:

$$\ddot{x} = -\frac{1}{\rho \cdot L} \cdot \frac{ExcSup \cdot P_{aver}}{V} \cdot x$$

with initial conditions:

$$\begin{cases} \dot{x}(0) = 0 \\ x(0) = \frac{R \cdot Tc}{ExcSup \cdot P_{aver}} \cdot \Delta n_0 \end{cases}$$

where:

$\Delta n_0$ initial mass unbalance (moles)

This equation considers just the inertial term, but we can have an idea on the action of the viscous portion adding the corresponding term. The viscous term can be approximated by the following relationship:

$$\xi \nabla^2 \vec{v} \approx \frac{\xi v}{L^2} \quad (\text{"Formule de Stokes"})$$

The transformed equation $$\ddot{x} = -\frac{1}{\rho \cdot L} \cdot \frac{ExcSup \cdot P_{aver}}{V} \cdot x + \frac{\xi}{L^2} \dot{x} \begin{cases} \dot{x}(0) = 0 \\ x(0) = \frac{R \cdot Tc}{ExcSup \cdot P_{aver}} \cdot \Delta n_0 \end{cases}$$

This equation is a second order differential equation and represents the equation of a dumped oscillator. The solution of this equation is:

$$x(t) = A \cdot e^{-\frac{\beta}{2}t} \cdot \sin(\omega_0 \cdot t + \varphi_0)$$

where:

$$\omega = \sqrt{\frac{1}{\rho \cdot L} \cdot \frac{ExcSup \cdot P_{aver}}{V}} \quad \text{coefficient for } x(t)$$

$$\beta = \frac{\xi}{L^2} \quad \text{coefficient for } \dot{x}(t)$$

$$\omega_0 = \sqrt{\omega^2 - \frac{\beta^2}{4}} \quad \text{angular velocity}$$

$$v_0 = \frac{\omega_0}{2\pi} \quad \text{frequency of oscillation}$$

$$TT = \frac{2\pi}{\omega_0} \quad \text{period of oscillation}$$

This solution describes how the air bounces back and forth between the two cells with a period of TT seconds. Using the previous values for the parameters we find:

TT=0.081 sec ($<<\delta t$)

The system response time to the unbalanced pressure is much less of the sampling time for system dynamics meaning that the variation of the pressure generated by servers exhausts can be immediately used in the next step of the calculation.

The Model Applied

Once the equation and the dynamics of the system have been defined, the following description provides a practical example to apply the principles of the self-adjusting model.

The physical layout of the data center represents the starting point for the model. It reports the environment dimensions in terms of the three coordinates plus the position in this environment of the racks and the servers in the racks. In this layout the cells are defined in such a way that they can describe the movement of the air as produced by the server fans. The model is three-dimensional, but because the cell is from floor to ceiling the air moves following a two-dimensional pattern (e.g., parallel to floor and ceiling) as described in FIG. 3. However, when drawing the model's cells all three dimensions are used. For example, the model uses the volume of the cell or the configuration of neighboring cells.

Once the positions of the racks and server have been defined, one or more servers are characterized in terms of parameters that can alter the environment in terms of thermal conditions: power, air flux, and temperature. Having the right interface and the right sensors in the target endpoint, these values can be read in run-time allowing a precise evaluation of the thermal variations inside a cell. The alternative is to use an average value defined by the normal usage of the endpoint.

Position and sensor data represent the input for the model that utilizes them to calculate the mass exchange between cells and the relative temperature adjustment. The model dynamics are defined by the fans that move the air and all the other parameters (pressure and temperature) are a byproduct of the calculation. What is important is just the exchange between two adjacent cells and they automatically adjust the conditions to minimize the differences.

The model will seek an even temperature distribution. To alter local hot spot conditions the system can move computational power from one cell to another by migrating VM(s) or with a combination of migrations and endpoint shutdowns/wakeups. Additionally, other mechanisms may be used to reduce a cell's temperature including, but not limited to, turning off unused circuitry (e.g., peripheral devices, ports, memory), reducing computational performance (e.g., adjust ASIC settings, add wait states, change fabric I/F mode, disable diagnostic routines), or implementing alternative cooling (e.g., additional fans, inter-board ventilation).

Example Embodiments

Figure 1:
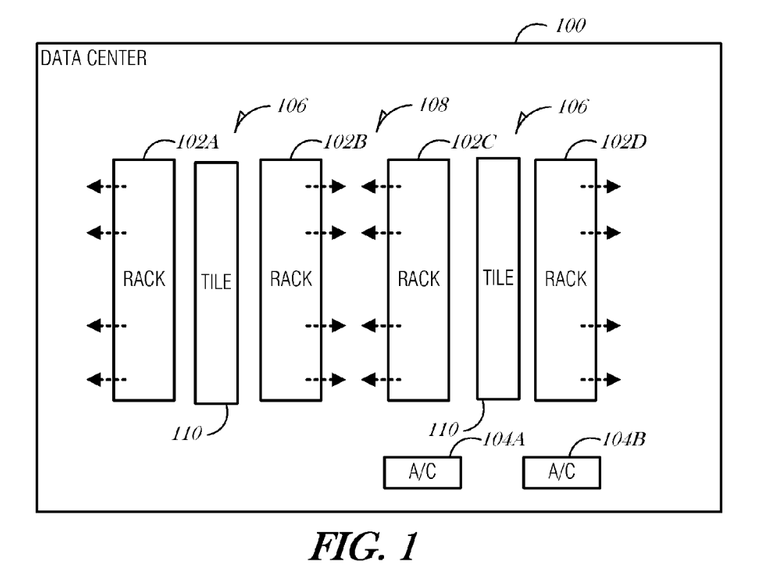
FIG. 1 is a block diagram illustrating a data center, according to an embodiment.

FIG. 1 is a block diagram illustrating a data center 100, according to an embodiment. In this document, the term "data center" refers to a facility that houses computational equipment and auxiliary machines. Data centers may occupy a room, an entire floor, or multiple floors in a building. Data centers may be containerized, such as with a shipping container or use of other moveable containers with computer equipment. Where data centers are containerized or otherwise separated (e.g., on multiple floors in a building or in multiple buildings), the model may be applied to each separate data center. The data center 100 depicted in FIG. 1 includes racks 102A, 102B, 102C, and 102D, and air conditioners 104A and 104B. Although the data center 100 in FIG. 1 is illustrated as containing four racks 102 and two air conditioners 104, it is understood that the data center 100 may include any number of racks 102 or air conditioners 104 without departing from the scope of the disclosure. In addition, the data center 100 includes perforated tiles 110 on the floor. Cold air is supplied from the air conditioners 104 via ducts or other space under the floor up through the tiles 110 to a cold aisle 106. Air then is moved as depicted by the dashed arrows, through the rack 102 to the hot aisle 108, in order to dissipate heat and cool electronic components installed in a rack 102. While the cold air is supplied via floor tiles 110 in the example illustrated in FIG. 1, it is understood that any manner of delivering cold air is encompassed by this disclosure including, but not limited to ceiling air ducts, wall air ducts, or combinations of such ducts.

The racks 102 may be aligned in rows, such as illustrated in FIG. 1. The racks 102 are aligned in a manner to create a cold aisle 106 and hot aisle 108. The racks 102 are generally configured to house a plurality of electronic components including, but not limited to computers, servers, monitors, hard drives, network line cards, battery backup devices, blade servers, etc. The electronic components may include subcomponents or subsystems, including processors, video cards, network interface cards, memories, expansion cards, fans, power converters and supplies, batteries, and the like.

Air flow of heated and cooled air is affected by the configuration of the racks 102 and other objects in the data center 100, such as air conditioners 104 and other objects not shown (e.g., walls, desks, or people). Air flow characteristics including temperature, direction, air mass, and pressure may be measured or inferred using one or more sensors installed in the data center 100. The sensors (not shown) may include sensors installed within an electronic component (e.g., a motherboard thermometer, a processor thermometer, or a fan sensor), on a rack 102 (e.g., a temperature or air flow sensor on the outside of the rack), or elsewhere in the data center 100 (e.g., an infrared thermometer installed in the ceiling of the data center to monitor one or more spots in the data center).

Figure 2:
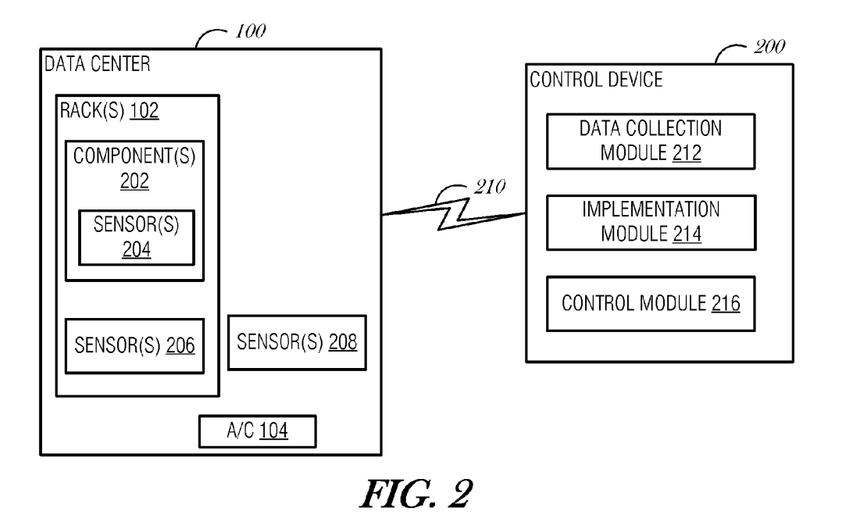
FIG. 2 is a block diagram illustrating the data center and a control device, according to an embodiment.

FIG. 2 is a block diagram illustrating the data center 100 and a control device 200, according to an embodiment. The control device 200 may be connected to one or more devices in the data center 100 including, but not limited to the rack(s) 102 and air conditioning unit(s) 104. In addition, the control device 200 may be connected one or more individual electronic components 202, one or more component-level sensors 204, one or more rack-level sensors 206, or one or more data center sensors 208. The control device 200 may be used to collect data from the sensors 204, 206, or 208, and control electronic component(s) 202 or air conditioning unit(s) 104 to manage power consumption and cooling in the data center 100.

The control device 200 may be any type of computing system including, but not limited to a distributed system, a cloud system, a laptop computer, a desktop computer, or the like. Some or all of the control device 200 may reside in one or more electronic components 202 of the data center 100. Alternatively, some or all of the control device 200 may be located remote from the data center 100. The control device 200 may be connected to the data center 100 or individual devices in the data center 100 through a communication network 210. The communication network 210 may include any communication network through which computer systems or devices may exchange data or information. To exchange data, devices may use various methods, protocols, and standards, such as token ring, Ethernet, wireless Ethernet, Bluetooth, TCP/IP (Transmission Control Protocol/Internet Protocol), UDP (User Datagram Protocol), HTTP (Hypertext Transfer Protocol), FTP (File Transfer Protocol), SNMP (Simple Network Management Protocol), SMS (Short Message Service), MMS (Multimedia Messaging Service), JSON (JavaScript Object Notation), SOAP (Simple Object Access Protocol), or CORBA (Common Object Request Broker Architecture). Various security mechanisms may be used such as TLS (Transport Layer Security), SSL (Secure Socket Layer), VPN (Virtual Private Network), or other encryption or security techniques.

The control device 200 includes a data collection module 212, an implementation module 214, and a control module 216, in an embodiment. The control device 200 may be configured to manage the data center 100, which includes a plurality of electronic components 202, where each of the electronic components 202 is configured to generate a variable level of heat load under varying power level utilizations. In an embodiment, the data collection module 212 is adapted to collect data describing heat loads generated by the plurality of electronic components 202. Heat loads may be estimated by measuring ambient temperature, surface temperature, or power supplied to one or more electronic components 202. Thus, in a further embodiment, the data collection module 212 is adapted to collect temperatures of the plurality of electronic components 202. Temperatures may be obtained using various sensors, such as sensors 204, 206, or 208, as discussed above.

In an embodiment, the implementation module 214 is adapted to implement a model to predict a thermal topology of the data center 100, where the model is based on thermodynamic state equations. The model is discussed in detail above and may be used to evaluate the present or future thermal topology. The racks 102, walls, air conditioning units 104, and other structural details of the data center 100 are parameterized to account for their effect on air flow, air flux, and temperature. The geometry of the data center 100 defines the boundary conditions. Thus, the model may be used to simulate the dynamics of heat and mass within the data center 100.

For example, hardware idle power dissipation may be calculated or measured. Executing processes on the hardware, such as virtual machines, may be cataloged and correlated to how much power a process consumes. Using this correlation, for example, it is possible to adjust the power of a server by managing processes on the server.

Figure 3:
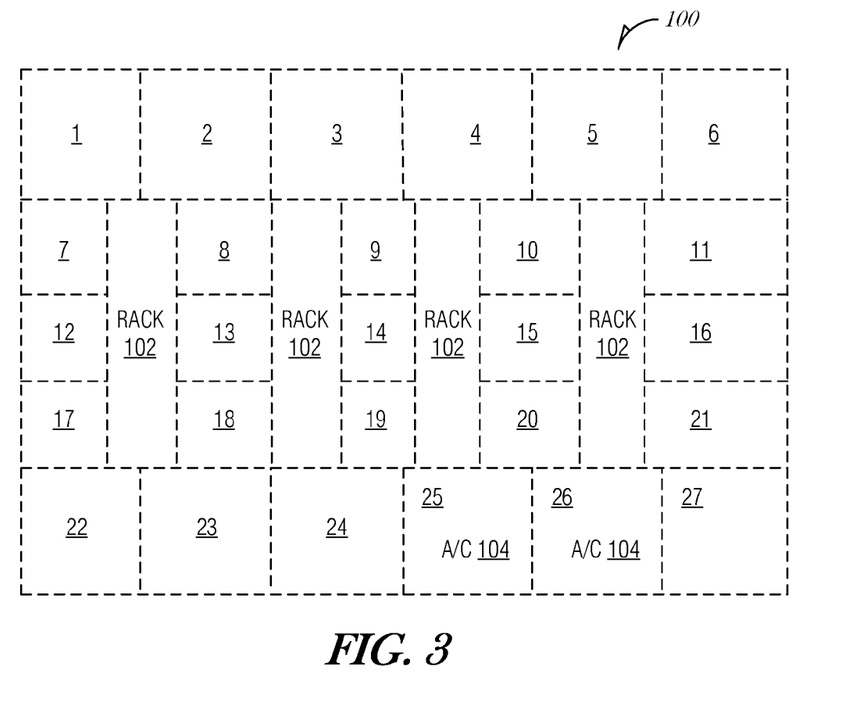
FIG. 3 is a schematic diagram illustrating the data center organized into a plurality of cells, according to an embodiment.

In a further embodiment, the implementation module 214 is adapted to implement the model by identifying a plurality of cells, the plurality of cells defining a space in the data center 100 and while iterating through pairs of cells selected from the plurality of cells, applying the thermodynamic state equations to each of the pairs of cells. FIG. 3 is a schematic diagram illustrating the data center 100 organized into a plurality of cells, according to an embodiment. In FIG. 3, twenty-seven cells are illustrated, numbering from 1 to 27. In general, cells that share a surface are considered adjacent. Thus, cells 1 and 7 are considered adjacent. Additionally, cells on either side of a rack 102 are considered adjacent for the purposes of the analysis. As such, for example, cells 7 and 8 are also considered adjacent. Given the volume of two adjacent cells, based on the state the cells, (e.g., pressure or temperature), the model is adapted to determine the effect of air flow from the intake cell to the exhaust cell.

In a further embodiment, the implementation module 214 is adapted to implement the model by identifying a heat load distribution of the plurality of electronic components 202 and calculating a temperature distribution forecast of the data center 100 based on the heat load distribution.

In a further embodiment, the implementation module 214 is adapted to implement the model by identifying a temperature distribution of the data center 100 and calculating an optimal heat load distribution of the plurality of electronic components 202 based on the temperature distribution. The target of the implementation module 214 is to avoid uneven heat distributions in a DC 100. Given as input the power adsorbed by each computing system or appliance the model may predict if such distribution can generate an uneven heat distribution. It also may find out what should be an optimal power distribution to avoid hot spots and using VM migration and/or computing systems adjustments can drive the power pattern in that direction. This kind of prediction and the calculation of an optimal power pattern is not possible with CFD models because they are too complex for real time analysis.

In an embodiment, a cell size corresponding to each of the plurality of cells is sized such that local air movement within a respective cell is not significant with respect to the model. In an embodiment, the plurality of cells within the model is defined by three state variables: pressure, temperature, and the number of moles.

Given a cell there are two kinds of parameters that are important:
  a. Thermodynamics parameters. These are the pressure P, the temperature T, and the quantity of air present in the cell, defined by the number of moles of air N. The volume V is important but it is not a variable, it is constant because once defined the size of the cell remains constant.
  b. Geometrical parameters. These are defined not just by the size of the cell but also defining, for every cell the neighbor cells to provide a pattern for the movement of the air.

In an embodiment, the control module 216 is adapted to adjust the heat load of at least one of the plurality of electronic components 202 based on the model. The heat load may be adjusted be adjusting power to the electronic component 202, such as by way of increasing or decreasing the number or type of processes executing on the electronic device. Additionally or alternatively, the heat load may be adjusted by adjusting cooling, such as by increasing or decreasing fan speed, raising or lowering the time or power of cooling machines, or combinations thereof.

A computing system dissipated the computation power as heat in the air and this air is released in the back of the system through the exhaust. This hot air increases temperature and pressure in the cell and will move the excess of air in the neighbor cells. Considering all the cells at the same time, a dynamic model of air movement is realized. The driving force is the power dissipated by each computing system. The model determines what the optimal power dissipation per computing system should be and manage the computing load of each system to meet or to get close to this pattern. Because the power dissipated is dependent on the programs executed, the control module 216 may modify the heat load corresponding to the computational power.

Thus, in a further embodiment, the control module 216 is adapted to adjust the heat load of a respective electronic component of the plurality of electronic components 202 by enabling or disabling the respective electronic component 202. For example, by disabling a blade server in a rack 102, the average exhaust temperature will decrease over time. It is also possible to move an entire server computing load somewhere else and turn the server off.

In a further embodiment, the control module 216 is adapted to adjust the heat load of a respective electronic component 202 of the plurality of electronic components 202 by moving a virtual machine from the respective electronic component 202 to another electronic component 202 of the plurality of electronic components 202. By moving the number or types of processes from one rack 102 to another rack 102, or from one portion of a rack 102 to another portion of a rack 102, the resulting heat output will be reduced or increased accordingly.

In a further embodiment, the control module 216 is adapted to adjust the heat load of a respective electronic component 202 of the plurality of electronic components 202 by cloning a virtual machine executing on the respective electronic component 202 to another electronic component 202 of the plurality of electronic components 202. Cloning of virtual machines may allow for load balancing and an overall optimization of cooling and processing.

In a further embodiment, the control module 216 is adapted to adjust the heat load of a respective electronic component 202 of the plurality of electronic components 202 by enabling or disabling a peripheral device of the respective electronic component 202. Peripheral devices such as expansion cards, network ports, co-processors, memories, hard drives, and the like may be enabled, disabled, or partially disabled (e.g., turning off a core in a multi-core processor) to control heat load.

Figure 4:
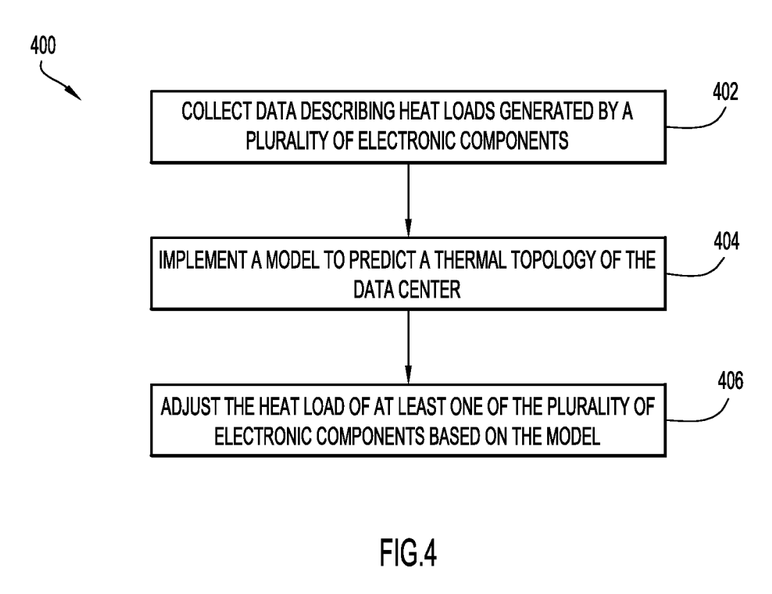
FIG. 4 is a flowchart illustrating a method of managing a data center including a plurality of electronic components, each of which are configured to generate varying levels of heat loads under varying power level utilizations, according to an embodiment.

FIG. 4 is a flowchart illustrating a method 400 of managing a data center including a plurality of electronic components, each of which are configured to generate varying levels of heat loads under varying power level utilizations, according to an embodiment. At block 402, data describing heat loads generated by the plurality of electronic components is collected.

At block 404, a model is implemented by a computing device, to predict a thermal topology of the data center, where the model is based on thermodynamic state equations. In an embodiment, implementing the model comprises identifying a plurality of cells, the plurality of cells defining a space in the data center. While iterating through pairs of cells selected from the plurality of cells, the thermodynamic state equations are applied to each of the pairs of cells, where a cell size corresponding to each of the plurality of cells is sized such that local air movement within a respective cell is not significant with respect to the model. Given the power consumption per computing system and the position of the computing system in the DC the model determines the equilibrium heat distribution with that power distribution. If the heat distribution is not optimal or close to the optimal state, the model determines how to move the power consumption among the computing systems to achieve an optimal (or near optimal) heat distribution.

At block 406, the heat load of at least one of the plurality of electronic components is adjusted based on the model. In an embodiment, adjusting the heat load of at least one of the plurality of electronic components comprises enabling or disabling at least a portion of a respective electronic component of the plurality of electronic components. In an embodiment, adjusting the heat load of at least one of the plurality of electronic components comprises moving a virtual machine executing on a first electronic component to a second electronic component of the plurality of electronic components.

In an embodiment, the model provides the position of the heat sources. This information cannot usually be provided by the network functions because the network is position agnostic. Thus, in an embodiment, a local positioning system is used (e.g., wireless meshed network) to determine the position of heat sources. Other mechanisms may be used to determine heat source locations according to various embodiments.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 5:
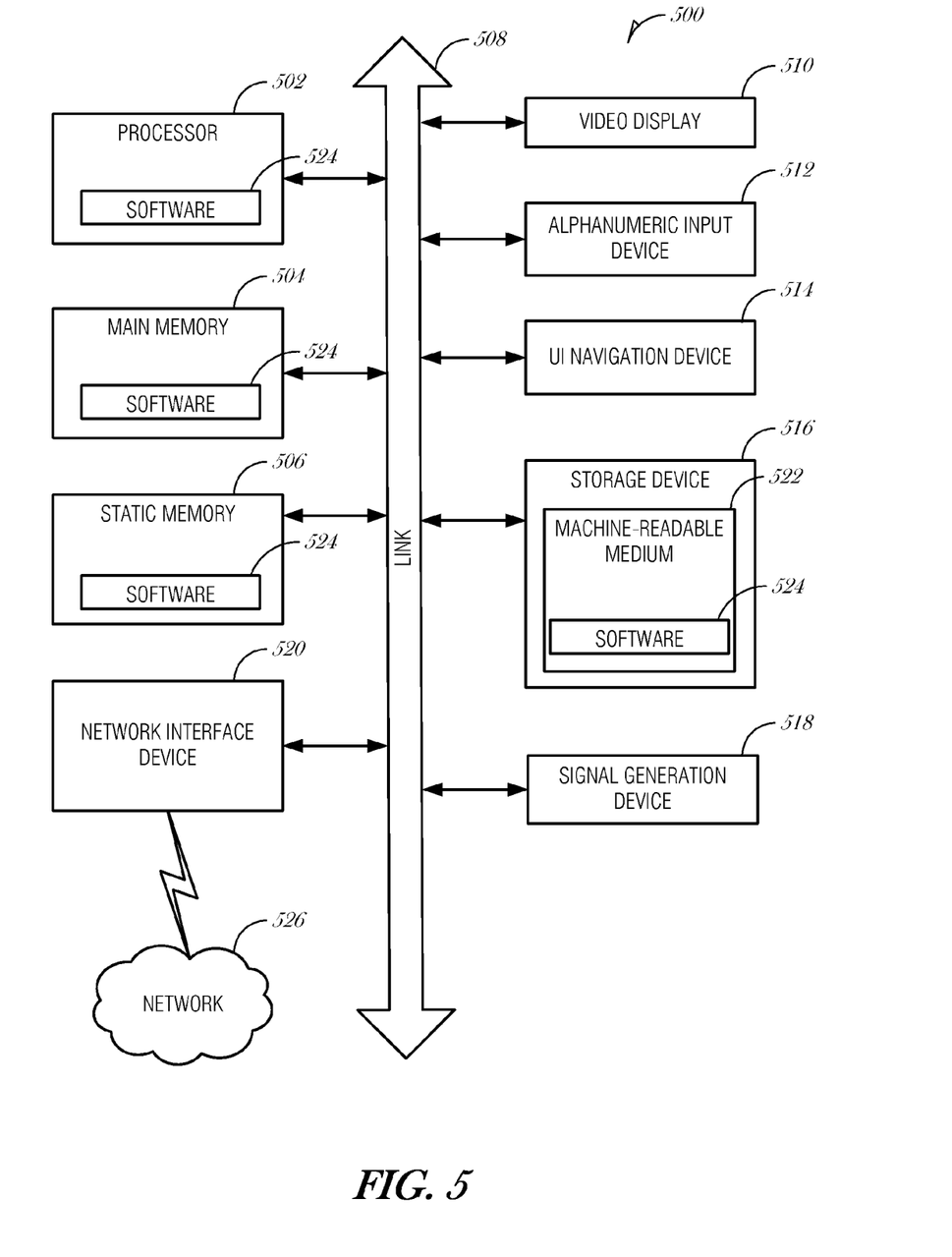
FIG. 5 is a block diagram illustrating a machine in the example form of a computer system, within which a set or sequence of instructions may be executed to cause the machine to perform any one of the methodologies discussed herein, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. In embodiments, the machine may be a personal computer (PC), a tablet PC, a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 505, static memory 506, and the processor 502 also constituting machine-readable media 522.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions 524 for execution by the machine and that cause the machine to perform any one or more of the methodologies of the present disclosure or that is capable of storing, encoding or carrying data structures utilized by or associated with such instructions 524. The term "machine-readable medium" shall accordingly be taken to include, but not be limited to, solid-state memories, and optical and magnetic media. Specific examples of machine-readable media 522 include non-volatile memory, including, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions 524 for execution by the machine, and includes digital or analog communications signals or other intangible medium to facilitate communication of such software.

Although embodiments have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system to manage a data center including a plurality of electronic components, each of which are configured to generate varying levels of heat loads under varying power level utilizations, the system comprising:
    a data collection module adapted to collect data describing heat loads generated by the plurality of electronic components;
    an implementation module adapted to implement a model to predict a thermal topology of the data center, wherein the model is based on thermodynamic state equations; and
    a control module adapted to adjust the heat load of at least one of the plurality of electronic components based on the model;
    wherein the implementation module is adapted to implement the model by:
    identifying a temperature distribution of the data center; and
    calculating an optimal heat load distribution of the plurality of electronic components based on the temperature distribution, wherein the optimal heat load distribution is calculated to achieve an even temperature distribution in the data center; and
    wherein the control module is adapted to adjust the heat load generated by at least one of the plurality of electronic components to achieve an even temperature distribution in the data center.

2. The system of claim 1, wherein the data collection module is adapted to collect temperatures of the plurality of electronic components.

3. The system of claim 1, wherein the implementation module is adapted to implement the model by:
    identifying a plurality of cells, the plurality of cells defining a space in the data center; and
    while iterating through pairs of cells selected from the plurality of cells, applying the thermodynamic state equations to each of the pairs of cells.

4. The system of claim 3, wherein a cell size corresponding to each of the plurality of cells is sized such that local air movement within a respective cell is not significant with respect to the model.

5. The system of claim 3, wherein the plurality of cells within the model are defined by three state variables: pressure, temperature, and the number of moles.

6. The system of claim 1, wherein the implementation module is adapted to implement the model by:
    identifying a heat load distribution of the plurality of electronic components; and
    calculating a temperature distribution forecast of the data center based on the heat load distribution.

7. The system of claim 1, wherein the control module is adapted to adjust the heat load of a respective electronic component of the plurality of electronic components by enabling or disabling the respective electronic component.

8. The system of claim 1, wherein the control module is adapted to adjust the heat load of a respective electronic component of the plurality of electronic components by moving a virtual machine from the respective electronic component to another electronic component of the plurality of electronic components.

9. The system of claim 1, wherein the control module is adapted to adjust the heat load of a respective electronic component of the plurality of electronic components by cloning a virtual machine executing on the respective electronic component to another electronic component of the plurality of electronic components.

10. The system of claim 1, wherein the control module is adapted to adjust the heat load of a respective electronic component of the plurality of electronic components by enabling or disabling a peripheral device of the respective electronic component.

11. A method of managing a data center including a plurality of electronic components, each of which are configured to generate varying levels of heat loads under varying power level utilizations, the method comprising:
collecting data describing heat loads generated by the plurality of electronic components;
implementing a model by a computing device, to predict a thermal topology of the data center, wherein the model is based on thermodynamic state equations; and
adjusting the heat load of at least one of the plurality of electronic components based on the model;
wherein implementing includes:
identifying a temperature distribution of the data center; and
calculating an optimal heat load distribution of the plurality of electronic components based on the temperature distribution, wherein the optimal heat load distribution is calculated to achieve an even temperature distribution in the data center; and
wherein adjusting includes adjusting the heat load generated by at least one of the plurality of electronic components to achieve an even temperature distribution in the data center.

12. The method of claim 11, wherein implementing the model comprises:
identifying a plurality of cells, the plurality of cells defining a space in the data center; and
while iterating through pairs of cells selected from the plurality of cells, applying the thermodynamic state equations to each of the pairs of cells, wherein a cell size corresponding to each of the plurality of cells is sized such that local air movement within a respective cell is not significant with respect to the model.

13. The method of claim 11, wherein adjusting the heat load of at least one of the plurality of electronic components comprises enabling or disabling at least a portion of a respective electronic component of the plurality of electronic components.

14. The method of claim 11, wherein adjusting the heat load of at least one of the plurality of electronic components comprises moving a virtual machine executing on a first electronic component to a second electronic component of the plurality of electronic components.

15. The method of claim 11, wherein adjusting the heat load of at least one of the plurality of electronic components comprises cloning a virtual machine executing on a first electronic component to a second electronic component of the plurality of electronic components.

16. A computer-readable storage medium comprising instructions for managing a data center including a plurality of electronic components, which when executed by a computer, cause the computer to:
collect data describing heat loads generated by the plurality of electronic components;
implement a model by a computing device, to predict a thermal topology of the data center, wherein the model is based on thermodynamic state equations; and
adjust the heat load of at least one of the plurality of electronic components based on the model;
wherein the instructions to implement a model comprise instructions, which when executed by the computer, cause the computer to:
identify a temperature distribution of the data center; and
calculate an optimal heat load distribution of the plurality of electronic components based on the temperature distribution, wherein the optimal heat load distribution is calculated to achieve an even temperature distribution in the data center; and
wherein the instructions to adjust the heat load of at least one of the plurality of electronic components comprise instructions, which when executed by the computer, cause the computer to adjust the heat load generated by at least one of the plurality of electronic components to achieve an even temperature distribution in the data center.

17. The computer-readable storage medium of claim 16, wherein the instructions to implement the model comprise instructions, which when executed by the computer, cause the computer to:
identify a plurality of cells, the plurality of cells defining a space in the data center; and
while iterating through pairs of cells selected from the plurality of cells, apply the thermodynamic state equations to each of the pairs of cells, wherein a cell size corresponding to each of the plurality of cells is sized such that local air movement within a respective cell is not significant with respect to the model.

18. The computer-readable storage medium of claim 16, wherein the instructions to adjust the heat load of at least one of the plurality of electronic components comprise instructions, which when executed by the computer, cause the computer to enable or disable at least a portion of a respective electronic component of the plurality of electronic components.

19. The computer-readable storage medium of claim 16, wherein the instructions to adjust the heat load of at least one of the plurality of electronic components comprise instructions, which when executed by the computer, cause the computer to move a virtual machine executing on a first electronic component to a second electronic component of the plurality of electronic components.

* * * * *